United States Patent
Soriano Fosas et al.

(10) Patent No.: US 9,975,363 B2
(45) Date of Patent: May 22, 2018

(54) MITIGATING PRINTER DAMAGE RISKS

(71) Applicants: HEWLETT-PACKARD DEVELOPMENT COMPANY L.P., Houston, TX (US); David Soriano Fosas, Sant Cugat del Vallés (ES); Javier González Bruno, Sant Cugat del Vallés (ES); Marc Soler Jauma, Sant Cugat del Vallés (ES)

(72) Inventors: David Soriano Fosas, Terrassa (ES); Javier Gonzalez Bruno, Terrassa (ES); Marc Soler Jauma, Cabrils (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/313,858

(22) PCT Filed: Jun. 3, 2014

(86) PCT No.: PCT/EP2014/061517
§ 371 (c)(1),
(2) Date: Nov. 23, 2016

(87) PCT Pub. No.: WO2015/185120
PCT Pub. Date: Dec. 10, 2015

(65) Prior Publication Data
US 2017/0197447 A1 Jul. 13, 2017

(51) Int. Cl.
*B41J 29/387* (2006.01)
*G01K 13/00* (2006.01)

(52) U.S. Cl.
CPC ............ *B41J 29/387* (2013.01); *G01K 13/00* (2013.01)

(58) Field of Classification Search
CPC ........ B41J 29/38; B41J 29/387; B41J 29/393; B41F 33/12; G01K 13/00; G06F 11/0748; G06F 11/0751; G06F 11/0757; G06F 11/273
See application file for complete search history.

(56) References Cited

U.S. PATENT DOCUMENTS

| | | | |
|---|---|---|---|
| 4,588,884 A * | 5/1986 | Priscott | B41F 33/12 101/232 |
| 4,740,671 A | 4/1988 | Kuroda et al. | |
| 5,300,981 A | 4/1994 | Shioya | |
| 5,359,392 A | 10/1994 | Muto | |
| 5,506,667 A | 4/1996 | Kinoshita | |

(Continued)

FOREIGN PATENT DOCUMENTS

EP 0506411 9/1992

OTHER PUBLICATIONS

"Canon IPF610Printhead overheat." Online posting. Copytechnetcom. http://www.copytechnet.com/forums/canon/48315-canon-ipf610-printhead-overheat.html?highlight=ipf610.

*Primary Examiner* — Anh T. N. Vo
(74) *Attorney, Agent, or Firm* — HP Inc. Patent Department

(57) ABSTRACT

Devices and methods are provided for mitigating printer damage risks. In examples a presence of a set of damage risk indicator signals at a printer is identified. A time period during which the damage risk indicator signals of the set are concurrently present is tracked, and a power supply is cut off if the time period exceeds a predetermined threshold time.

20 Claims, 4 Drawing Sheets

(56) References Cited

U.S. PATENT DOCUMENTS

| | | | |
|---|---|---|---|
| 7,035,556 B2 | 4/2006 | Behnke et al. | |
| 7,148,979 B1 * | 12/2006 | Yanagawa | G06F 11/0733 |
| | | | 358/1.14 |
| 2008/0267643 A1 | 10/2008 | Takami | |

* cited by examiner

MITIGATING PRINTER DAMAGE RISKS

BACKGROUND

Many inkjet printers use a thermal inkjet process. In a thermal inkjet process, the printheads contain a series of tiny chambers, each containing a heater such as a resistor. To eject a droplet of printing fluid from a chamber, a pulse of current is passed through the heating element causing a rapid vaporization of the ink in the chamber to form a bubble, which causes a large pressure increase, propelling a droplet of printing fluid, such as ink, onto the underlying media. Similarly, in 3D printers, a printhead prints on a layer of powered build material on a movable print support.

The printing process may consume several hundred of watts, which are provided by a power supply.

BRIEF DESCRIPTION

Some non-limiting examples of methods and apparatus for mitigating printer damage risks will be described in the following with reference to the appended drawings, in which.

DETAILED DESCRIPTION

When a thermal inkjet printhead is damaged, malfunctions or suffers degradation, it may overheat, achieving very high temperatures. This may cause damage to the printhead or even to the printer as the printhead may even partially melt. Furthermore, when such a situation occurs on top of a paper or other inflammable printing medium, it may be possible that the medium may ignite and catch fire, which, in extreme situations, may also propagate to other elements of the printer or even beyond. In other examples, when a printhead of a 3D printer is damaged, it may overheat. When the printhead overheats it may similarly be possible for the powered build material to ignite and catch fire.

Printers implement several mechanisms to mitigate this risk, but most of them are encoded or implemented in software. Therefore, if software malfunctions or fails to detect a damage risk situation, it is possible that a dangerous event or condition may progress to cause damage.

Scanning printers, in similar damage risk situations, have a no-print time between carriage passes. This time may be used to implement alternative solutions for damage or fire mitigation. For example, the printer software may measure the electrical power consumed by the printhead during the no-print time, which should be zero. In case of detecting even a small consumption, it may declare the printhead as defective, and thus at risk of causing damage or fire, and cutoff or shut down the main power supply.

However, in a page-wide array system, the media moves at a continuous speed under a print bar constructed by an arrangement of thermal ink-jet printheads: the printer may print continuously with minimum or no stops. Therefore a printhead may consume several hundred of watts and there may be no way to detect if this power is employed to eject printing fluid or it may be consumed, for example, by an internal short circuit.

Some printers implement a system that may compute the number of drops being fired in a certain instant, extrapolate the theoretical power consumption and compare it with the result of a printhead current measuring circuit. This solution may be very inaccurate since the firing energy of a drop may vary with temperature. Up to 30% variation in the firing energy may be expected in some cases. Such an error in power measurement might be acceptable for low power consumption printers. However, in high throughput machines, this tolerance may be above a limit to create a damage or fire event and, in case of failure or degradation, in many cases the printhead may suffer a significant overheat.

The present disclosure provides hardware-based implementations that at least partially reduce damage risk.

Figure 1:
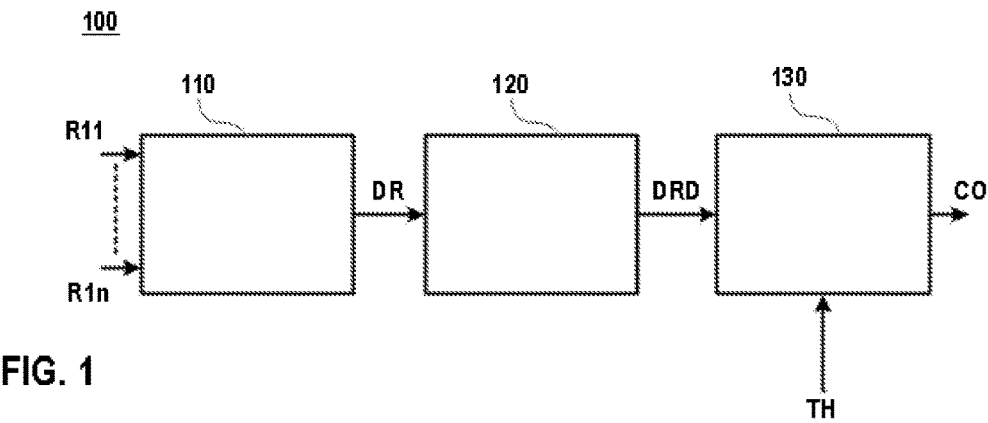
FIG. 1 is a block diagram of an example printer damage risk mitigating device according to an implementation.

FIG. 1 is a block diagram of an example printer damage risk mitigating device according to an implementation. Device 100 comprises damage risk detector 110, timer circuit 120 and cutoff module 130. Damage risk detector 110 may receive damage risk indicator signals R11 to R1$n$ from a printer to identify a damage risk condition and output a damage risk signal DR, wherein this signal has a predetermined level when the damage risk condition is identified.

In some implementations this predetermined level of the damage risk signal DR corresponding to the identification of the damage risk condition may be a logical 0, while in other implementations it may be a logical 1. However, other implementations of the damage risk detector 110 outputting different damage risk signals DR having different predetermined levels are also possible, provided that the damage risk signal DR is used to trigger the timer circuit 120.

Timer circuit 120 may receive the damage risk signal DR and output a damage risk duration signal DRD, the value of the damage risk duration signal depending on the time during which the damage risk signal DR maintains the predetermined level that is associated with the damage risk condition. Cutoff module 130 may receive the damage risk duration signal DRD and output a cutoff signal CO to cut off a power supply when the value of the damage risk duration signal DRD exceeds a predetermined threshold TH, thereby mitigating the damage risk.

The device may monitor several events to identify a condition that may be considered as posing a risk of damage to the printer, and allow such condition to continue for a predetermined period of time, during which a reaction from the printer's software may be expected. However, unless the software reacts within the predetermined time, the device may cut off the power supply. For example, in case a printhead fails and at the same time there is a system crash or software hang, the software would not detect the printhead failure, which would then continue: a fire ignition risk would increase beyond an acceptable point. A device such as described herein may, after a predetermined time, override the software and cut off the power supply.

In example implementations, the damage risk indicator signals R11 to R1$n$ may comprise a media still indicator signal R11 for indicating that a processed media is still and a printhead power supply indicator signal R12 for indicating that a printhead is powered. A concurrent presence of the two signals may be a damage risk condition and may set the damage risk indicator signal DR at the output of the damage risk detector 110 to the predetermined level (for example a logical 0). If this level of the signal persists for more than a predetermined time, the cutoff signal CO may be emitted.

Figure 2:
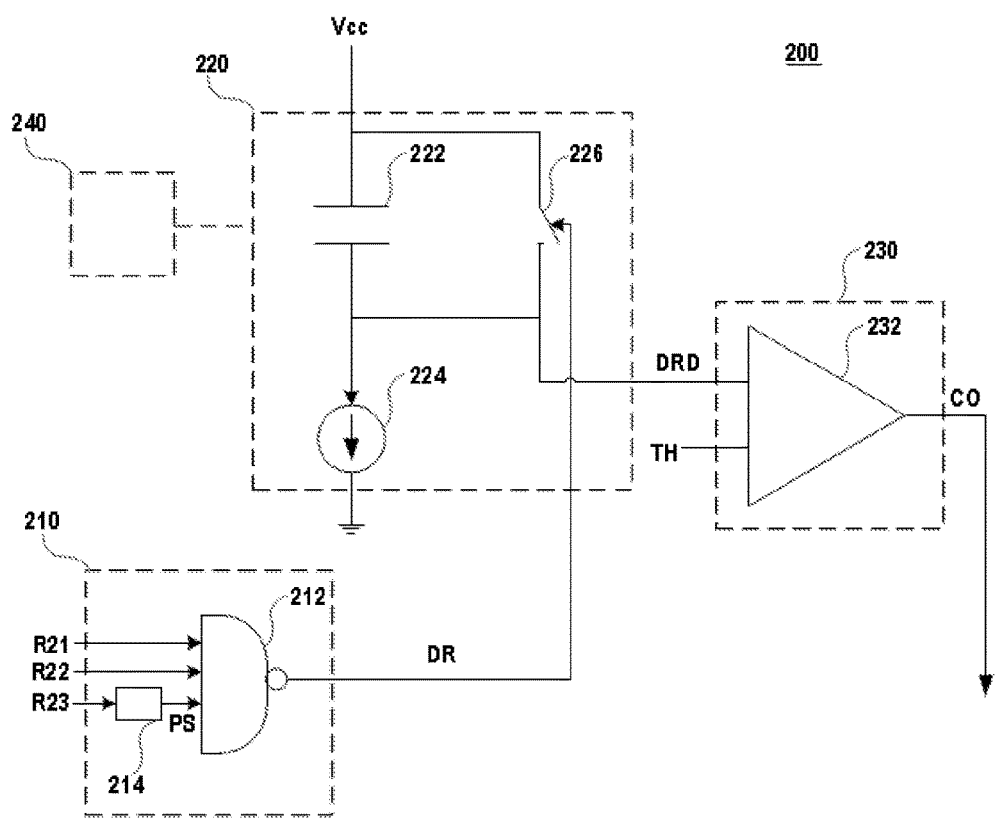
FIG. 2 is a circuit level diagram of an example printer damage risk mitigating device according to an implementation.

FIG. 2 is a circuit level diagram of an example printer damage risk mitigating device according to an implementation. Device 200 may comprise damage risk detector 210, timer circuit 220 and cutoff module 230. Damage risk detector 210 may comprise three inputs for receiving three damage risk indicator signals R21, R22 and R23.

For example, a paper present signal R21 for indicating the presence of paper in a print zone, a printhead power supply indicator signal R22 for indicating that a printhead is powered, and a paper roll encoder signal R23 for indicating if there is movement of the paper.

In the example of FIG. 2, the damage risk detector 210 may further comprise a high pass filter 214 to receive the paper roll encoder signal R23 and generate a paper still signal PS, which in this case is employed as a damage risk indicator.

A damage risk condition may be identified when all three signals are concurrently present. In this example, the damage risk may be a fire risk, because in case the powered printhead overheats it may cause ignition of the paper, which is present in the print zone and is not moving.

Damage risk detector 210 may comprise a logic gate 212, in this example a NAND gate, having an input to receive damage risk indicator signals R21, R22 and PS. When any of the three signals R21, R22 and PS is zero, for example if the printhead is not powered (R22=0) or if the paper is moving (PS=0), the damage risk signal DR at the output of logic gate 212 is a logic 1. When all three damage risk indicator signals R21, R22 and PS are present at the input of the logic gate 212 (R21=1, R22=1 and PS=1), then the damage risk signal DR at the output of logic gate 212 is a logic 0, which is the predetermined level associated with the damage risk condition.

The timer circuit 220 may comprise a capacitor 222, having a discharge time, with a first terminal connected to a power supply voltage Vcc. The timer circuit 220 may further comprise a current source 224 connected at one end to a second terminal of the capacitor and at another end to ground, and a switch 226 connected at one end to the first terminal of the capacitor 222 and at another end to the second terminal of the capacitor 222 and to the cutoff module 230.

The switch may be operable by the damage risk signal DR, such that the switch is closed and the capacitor 222 is charged when the damage risk signal DR at the output of logic gate 212 is a logic 1, while the switch is open and thus the capacitor 222 is allowed to discharge when the damage risk signal DR at the output of logic gate 212 is a logic 0, that is, when there is a damage risk condition.

The voltage at the second terminal of the capacitor 222 provides the damage risk duration signal DRD: this signal has a value Vcc when the switch 226 is closed, and starts decreasing when the switch 226 is opened and the capacitor 222 starts discharging, that is, when the damage risk signal DR at the output of logic gate 212 becomes a logic 0 (damage risk condition).

The cutoff module 230 may comprise a comparator 232 having a first input to receive the damage risk duration signal DRD and a second input to receive a predetermined threshold TH. The predetermined threshold TH may be a voltage value lower than the Vcc voltage value. The comparator may generate the cutoff signal CO when the damage risk duration signal DRD oversteps the predetermined threshold TH, that is, when the damage risk DR has been a logic 0 (risk condition) for a predetermined time. In other words, the predetermined time may be considered the time it takes for the DRD signal, that is a voltage signal, to decrease from the voltage value Vcc to the voltage threshold value TH. Seen from the perspective of the capacitor 222, the predetermined time may be considered the time required by the capacitor 222 to discharge from the voltage value Vcc to the predetermined threshold TH voltage value.

This discharge time of the capacitor 222 may thus be the time required for the value of the damage risk duration signal DRD to overstep the predetermined threshold TH.

In example implementations the timer circuit may further comprise logic 240 to selectably set the discharge time of the capacitor. Thus, it may be possible to extend or reduce the time that the damage risk duration signal DRD requires before reaching the threshold value TH.

Figure 3:
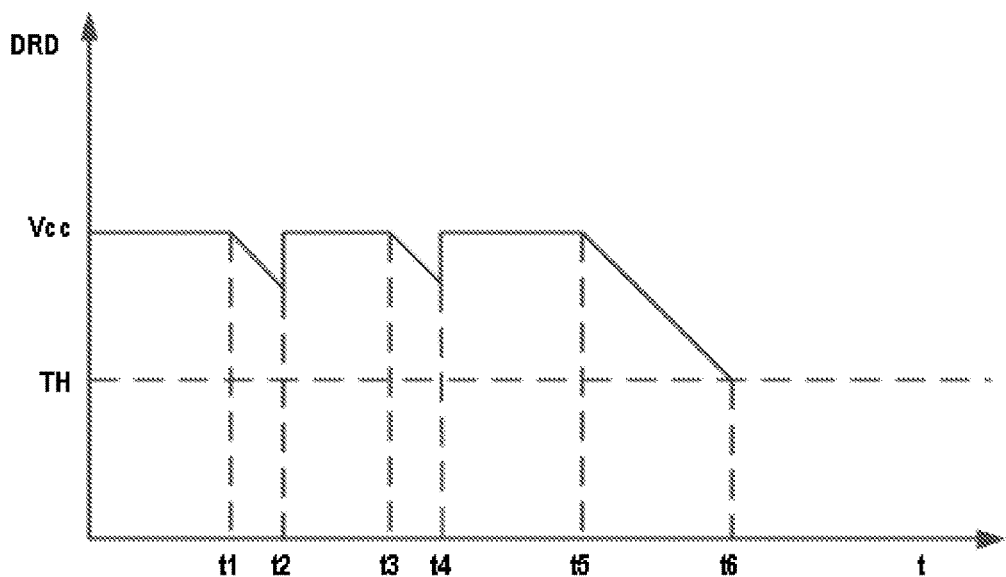
FIG. 3 illustrates an example damage risk duration DRD signal vs time chart for the timer circuit of FIG. 2.

FIG. 3 illustrates an example DRD signal vs time chart for the timer circuit of FIG. 2. During a first time period, until the moment t1, the damage risk duration signal DRD signal has a value equal to Vcc. This period may be a period when no damage risk condition is present, i.e. the damage risk signal may be equal to a logical 1 and may not trigger the timer circuit. Then, at the moment t1, the damage risk signal DR may assume a predetermined level of a logical 0 and the timer circuit may thus be triggered. The switch 226 is opened, the capacitor 222 begins to discharge and the DRD signal begins to TH value, the DR signal is no longer present and the capacitor is charged again so that the DRD signal assumes the value Vcc again. Then at a moment t3 the timer circuit may be triggered again by the damage risk signal DR. The switch 226 is thus opened and the capacitor 222 begins again to discharge. However, again, at a moment t4, before the DRD value reaches the TH value, the DR signal is no longer present, the capacitor is charged and the DRD signal assumes again the value Vcc. The timer circuit may be triggered once more by the damage risk signal DR at a moment t5. The switch 226 is opened and the capacitor 222 begins once more to discharge. Contrary to the previous occasions, the DRD value reaches and oversteps the TH value at a moment t6. Thus the CO signal is generated by the cutoff module 230 and the power supply is cut off. It may be assumed that the time period between t5 and t6 corresponds to the predetermined time discussed with reference to FIG. 2.

Figure 4:
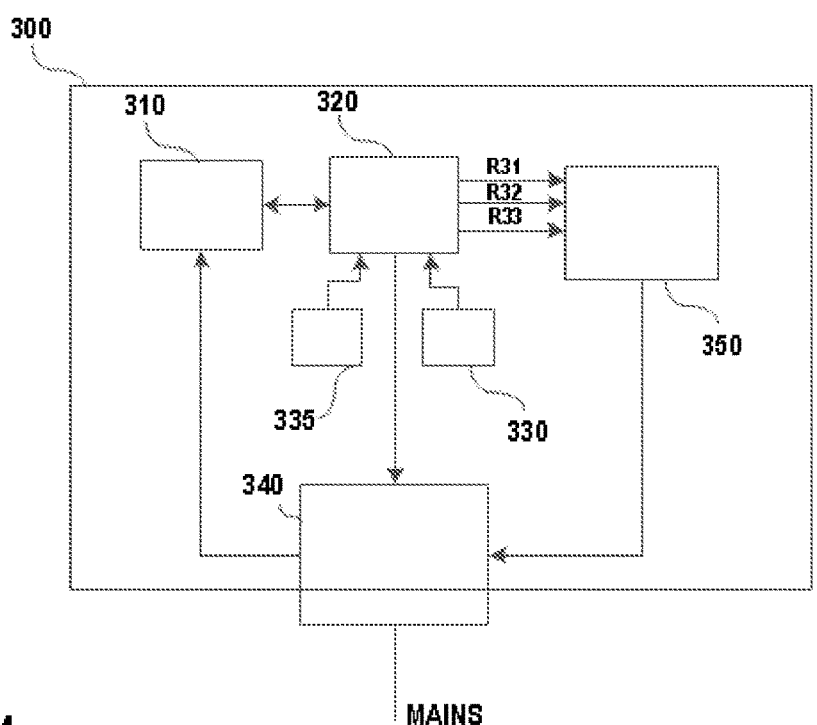
FIG. 4 is a block level diagram of a printer incorporating a damage risk mitigating device according to an implementation.

FIG. 4 is a block level diagram of an example printer incorporating a damage risk mitigating device according to an implementation. Printer 300 may be a page wide array printer and may comprise a printhead 310 or an array of printheads. Printhead 310 may be a thermal inkjet printhead. During normal operation a controller 320, e.g. a software controller, may interact with the printhead 310 to control the power of the printhead. A paper roll mechanism 330 may be used to monitor and control the advancement of paper and a paper sensor 335 may be used to monitor presence of paper in a print zone. Furthermore, the controller 320 may control the power supply 340 that provides power to the printhead 310.

The controller 320 may provide signals R31 to R33 to damage risk mitigating device 350. Signal R31 may correspond to a paper present signal, R32 to a printhead power supply signal and R33 to a paper still signal. The device 350 may monitor the three signals R31 to R33. When the concurrent presence of the three signals is detected, such that a risk condition is identified, a timer circuit of the device 350 is started. If the controller 320 fails to act within a predetermined time and the concurrent presence of the three signals is maintained above the predetermined time, the device 350 may cut off the power supply 340 to mitigate the risk of damage or fire.

In some examples the damage risk mitigating device 350 may alert the controller 320 prior to cutting off the power supply 340 to allow for the controller 320 to perform a protective or warning action to prevent power cutoff, or before cutoff in effected. For example, when the damage risk mitigating device 350 detects a damage risk condition, it may first trigger a damage alert signal midway through the predetermined time. This damage alert signal may be considered an intermediate soft action to instruct the controller 320 to apply a software implemented security protocol, e.g. to interrupt the power provided to the printhead. If the controller takes such action following the damage alert signal, e.g. interrupts the power provided to the printhead, then the signal R32 would cease to be emitted. Consequently, the level of the damage risk signal DR would not be such as to trigger the timer circuit of the device 350. Thus the timer circuit would reset and no cutoff would take place.

In other examples the damage risk mitigating device 350 may alert the controller 320 prior to cutting off the power supply 340 to allow for the controller 320 to display an error message to the user, to be displayed e.g. at the user's terminal when the power is cutoff or the printer is switched off by the damage risk mitigating device 350.

Figure 5:
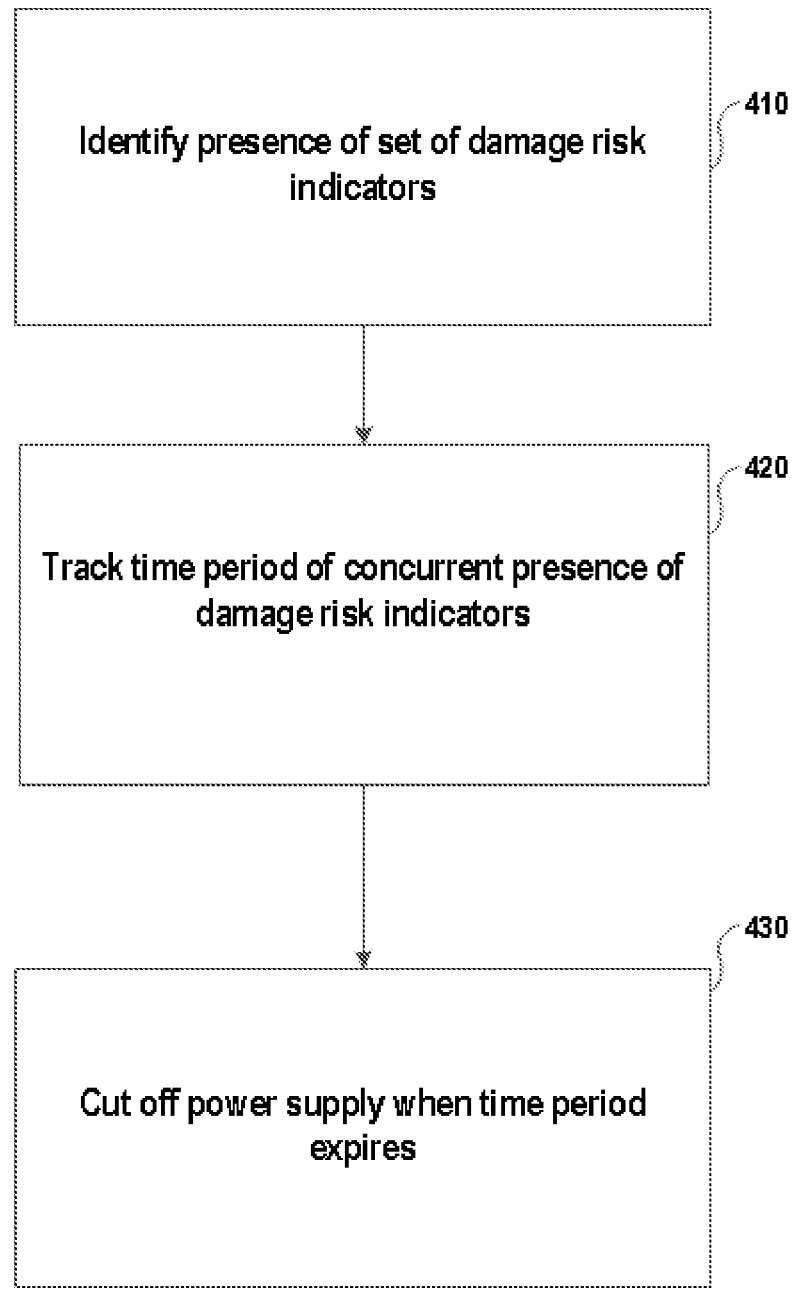
FIG. 5 is an example flowchart of a process of mitigating printer damage risk according to an implementation.

FIG. 5 is an example flowchart of a process of mitigating printer damage risk according to an implementation. In block 410, a presence of a set of damage risk indicator signals may be identified at a printer. For example, the set of indicator signals may include a printing media present signal for indicating the presence of paper, a media roll encoder signal for indicating that the printing medium is still, and a printhead power supply signal for indicating that a printhead is powered. In block 420, a time period during which the damage risk indicator signals of the set are concurrently present may be tracked. In block 430, if the time period exceeds a predetermined threshold time, a power supply, such as a printer power supply, may be cut off. The predetermined threshold time may be selected according to the printer. For example, it may be selected according to historical measurements of printhead overheat conditions, and/or taking into account the time in which a reaction from the software is expected. The range may be for example from a few milliseconds to a few seconds. In some examples the predetermined threshold time may even be configurable. In case a printer is always attended a higher threshold time may be tolerable. In case a printer is not regularly attended, e.g. belonging to a printer group or to an unattended printer room, the threshold time may be set lower.

Figure 6:
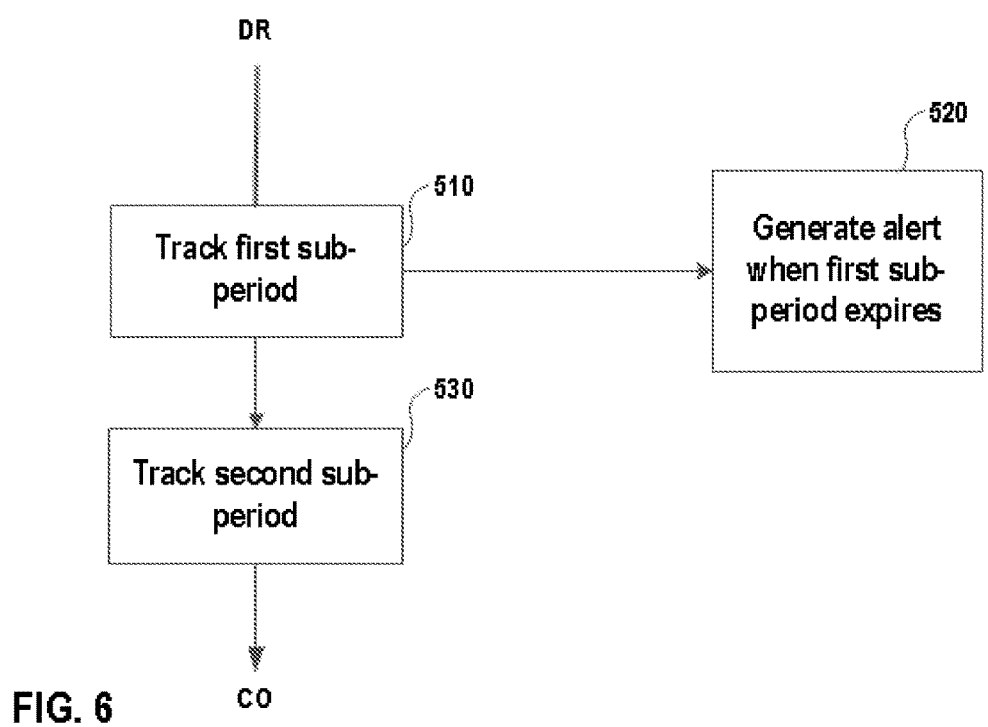
FIG. 6 is an example flowchart of a process of tracking a period of concurrent presence of damage risk indicators.

FIG. 6 is a flowchart of an example process of tracking a period of concurrent presence of a set of damage risk indicators. In block 510, a first time sub-period of the time period during which damage risk signal DR has the predetermined level may be tracked. If the first time sub-period elapses then an alert may be generated in box 530. The alert may, for example, be an instruction to the controller or other software module to take action before the device cuts off the power supply or simply to display an error or alert message at a user's monitor. In parallel to the generation of the alert, the process continues to track the concurrent presence of the damage risk indicator signals during a second sub-period in box 540 either until action is taken by the controller or software module or until the time period during which the damage risk signal DR has the predetermined level has expired. In the former case the tracking process may reinitiate, while in the latter case the power supply may be cut off.

The invention claimed is:

1. A device comprising:
    a damage risk detector to receive damage risk indicator signals from a printer to detect a damage risk condition and output a damage risk signal having a predetermined level when the damage risk condition is identified,
    a timer circuit to receive the damage risk signal and output a damage risk duration signal, a value of the damage risk duration signal depending on a time during which the damage risk signal maintains the predetermined level, and
    a cutoff module to receive the damage risk duration signal and output a cutoff signal to cut off a power supply when the value of the damage risk duration signal exceeds a predetermined threshold, thereby mitigating the damage risk.

2. The device in accordance with claim 1, the damage risk indicator signals comprising a media still indicator signal for indicating that a media is still and a printhead power supply indicator signal for indicating that a printhead is powered.

3. The device in accordance with claim 1, the damage risk indicator signals comprising
    a media present signal for indicating presence of paper in a print zone;
    a media roll encoder signal for indicating if there is movement of the paper; and
    a printhead power supply indicator signal for indicating that a printhead is powered.

4. The device in accordance with claim 3, the damage risk detector further comprising a high pass filter to receive the media roll encoder signal and generate a paper still signal.

5. The device in accordance with claim 1, the damage risk detector comprising a logic gate having an input to receive the damage risk indicator signals and set the damage risk signal to the predetermined level when all damage risk signals are present at the input of the logic gate.

6. The device in accordance with claim 1, the timer circuit comprising a capacitor, having a discharge time, arranged to discharge when the damage risk signal has the predetermined level and charge when the damage risk signal has a level other than the predetermined level.

7. The device in accordance with claim 6, wherein the timer circuit comprises logic to selectably set the discharge time of the capacitor.

8. The device in accordance with claim 6, wherein the capacitor has a first terminal connected to a power supply voltage of the power supply, the timer circuit further comprising
    a current source connected at one end to a second terminal of the capacitor and at another end to ground, and
    a switch connected at one end to the first terminal of the capacitor and at another end to the second terminal of the capacitor and to the cutoff module,
    the switch being operable by the damage risk signal.

9. The device in accordance with claim 1, the cutoff module comprising a comparator having a first input to receive the damage risk duration signal and a second input to receive the predetermined threshold, wherein the comparator generates the cutoff signal when the damage risk duration signal reaches the predetermined threshold.

10. A printer comprising a device in accordance with claim 1.

11. The printer in accordance with claim 10, the printer comprising a thermal inkjet printhead.

12. The printer in accordance with claim 10, the printer being a wide array printer.

13. A method comprising:
   detecting a presence of a set of damage risk indicator signals at a printer,
   tracking a time period during which the damage risk indicator signals of the set are concurrently present indicative of a damage risk occurring, and
   cutting off a power supply if the time period exceeds a predetermined threshold time, thereby mitigating the damage risk.

14. The method in accordance with claim 13, wherein the set of damage risk indicators comprises:
   a media present signal,
   a media still signal, and
   a printhead power supply signal.

15. The method in accordance with claim 13, further comprising:
   tracking a first time sub-period of the time period during which the damage risk indicator signals of the set are concurrently present;
   generating an alert after the first time sub-period.

16. A device comprising:
   a damage risk detector to receive a plurality of damage risk indicator signals from a printer to detect a damage risk condition and output a damage risk signal when the damage risk condition is identified,
   a timer circuit to receive the damage risk signal and output a damage risk duration signal indicative of a time during which the damage risk signal indicates that the damage risk condition is occurring, and
   a cutoff module to receive the damage risk duration signal and output a cutoff signal to cut off a power supply when the damage risk condition has persisted for a time that exceeds a predetermined threshold, as indicated by a value of the damage risk duration signal.

17. The device of claim 16, wherein the damage risk indicator signals comprise a signal indicating power being supplied to a printhead and a signal indicating whether there is movement of print media.

18. The device of claim 17, wherein the damage risk indicator signals further comprise a signal indicating presence of print media in a print zone.

19. The device of claim 18, further comprising a NAND gate receiving the damage risk indicator signals, wherein the NAND gate outputs the damage risk signal when the damage risk indicator signals indicate that power is being supplied to the printhead, print media is present in the print zone and is not moving.

20. The device of claim 16, further comprising a comparator to receive the damage risk duration signal and a threshold signal, the comparator outputting the cutoff signal when the damage risk duration signal equals the threshold signal.

* * * * *